(12) United States Patent
Gaeth

(10) Patent No.: US 6,637,284 B1
(45) Date of Patent: Oct. 28, 2003

(54) POSITION DEPEND TILT AND TELESCOPING STEERING COLUMN

(75) Inventor: Gerald A. Gaeth, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 1 day.

(21) Appl. No.: 10/124,446

(22) Filed: Apr. 16, 2002

(51) Int. Cl.[7] ................................................. B62D 1/18
(52) U.S. Cl. .......................................... 74/493; 74/492
(58) Field of Search .................................. 74/492, 493

(56) References Cited

U.S. PATENT DOCUMENTS

| | | | | |
|---|---|---|---|---|
| 4,775,939 A | * | 10/1988 | Nakashima et al. | 701/49 |
| 4,903,540 A | * | 2/1990 | Beauch | 74/493 |
| 5,019,759 A | * | 5/1991 | Takemura et al. | 318/466 |
| 5,911,789 A | * | 6/1999 | Keipert et al. | 74/493 |

* cited by examiner

Primary Examiner—David Fenstermacher
(74) Attorney, Agent, or Firm—Michael D. Smith

(57) ABSTRACT

A steering column assembly moveable along an axis to an extended and retracted position and having a hand wheel tiltable about a pivot axis between tilted and untilted positions is provided. A control mechanism limits the degree of tilting movement of the hand wheel so that while the steering column assembly is in the extended position, the steering column is tiltable to the first maximum tilt angle, and while in the retracted position, the steering column is tiltable to the second maximum tilt angle. The second maximum tilt angle is less than the first maximum tilt angle to prevent the steering column assembly from interfering with any portion of a vehicle.

6 Claims, 2 Drawing Sheets

US 6,637,284 B1

POSITION DEPEND TILT AND TELESCOPING STEERING COLUMN

BACKGROUND OF THE INVENTION

1. Field of the Invention

The invention relates generally to steering column assemblies, and more particularly to telescoping and tilting steering column assemblies.

2. Related Art

It is often convenient to a driver of a vehicle to have a steering column assembly having a hand wheel that can both telescope inwardly and outwardly, while also being able to tilt upwardly and downwardly. The tilting and telescoping features of a steering column assembly allow the driver to adjust the hand wheel to the desired position while driving the vehicle, while also allowing the driver to position the hand wheel to a position that best allows getting in and out of the vehicle. Generally, when driving a vehicle, the desired "use" position of the hand wheel is in a telescopically extended position toward the driver, while also having a certain degree of tilt to provide the most comfortable position of the hand wheel. However, when the driver is entering or exiting the vehicle, generally, the most desired "stowed" position of the hand wheel is fully retracted and tilted in an upward position to provide optimum access.

One problem encountered by such systems is that the hand wheel, when moved to a telescopically retracted and upwardly tilted stowed position, may interfere with the instrument panel which is undesirable and can cause potential damage to the instrument panel, and/or hand wheel.

One solution for preventing the hand wheel from contacting the instrument panel when in the fully retracted upwardly tilted stowed position is to limit the freedom of tilting movement and/or telescoping movement so that the hand wheel does not move far enough to contact the instrument panel of the hand wheel. However, this solution has the inherent drawback of limiting the overall telescoping and tilting adjustability when the hand wheel is in the extended use position, and thus offering less than optimum adjustability to the driver.

A position dependent tilt and telescoping steering column constructed according to the present invention overcomes or greatly minimizes the above limitations of prior steering columns.

SUMMARY OF THE INVENTION

A steering column assembly is constructed to allow for an otherwise full range of tilting while preventing the steering column assembly from interfering with any portion of the vehicle while in a tilted position. The steering column assembly has an upper steering shaft that is capable of telescoping to an extended and retracted position, while also being capable of tilting from an untilted position to a tilted position. While the steering column assembly is in the extended position, the upper steering shaft can be tilted to a position, thus forming a first maximum tilt angle between the untilted position and the tilted position In addition, while the steering column assembly is in the retracted position, the upper steering shaft is moveable to a tilted position to form a second maximum tilt angle between the untilted position and the tilted position. The second maximum tilt angle formed while in the retracted position is less than the first maximum tilt angle formed while in the extended position, thus preventing the steering column assembly from interfering with any portion of a vehicle.

One advantage offered by this invention is that the steering column assembly, while in an extended position, has a full range of tiltable movement, however while in a retracted position has a reduced degree of tiltable movement to prevent interfering of a hand wheel with an instrument panel or any other portion of the vehicle.

Another advantage offered by this invention is that the degree of tilt of the upper steering shaft throughout the range of telescopic travel can be provided to best suit the intended application.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
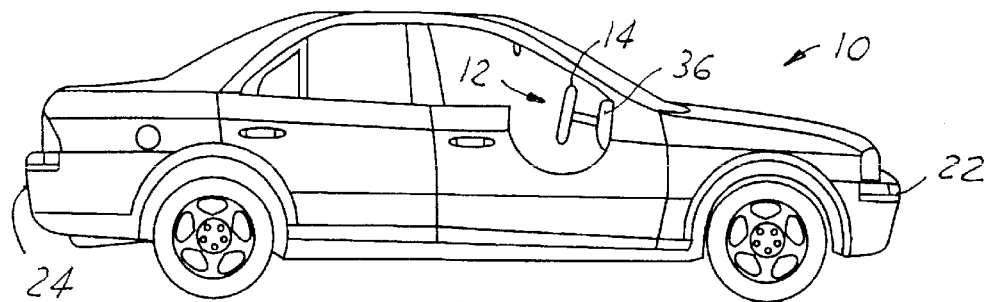
FIG. 1 shows a vehicle having a steering column embodying a currently preferred embodiment of the present invention.
Figure 2:
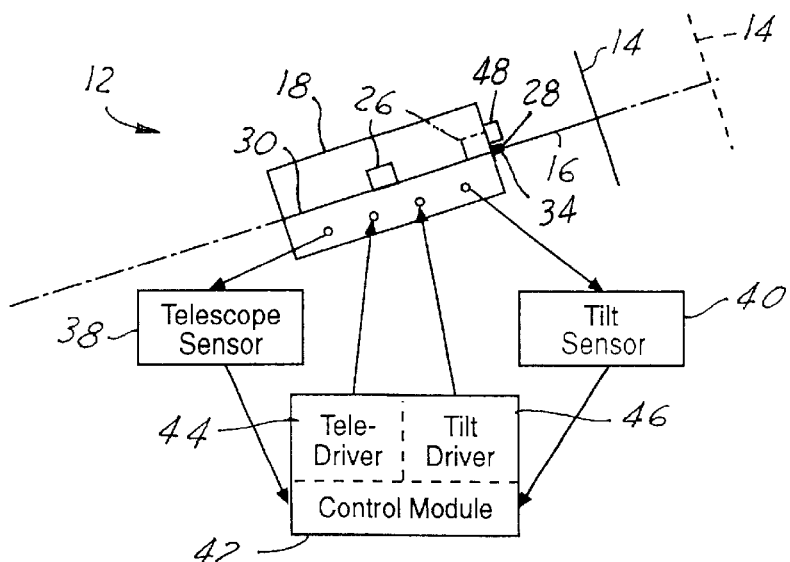
FIG. 2 is a schematic view of the steering column assembly from FIG. 1 showing an extended and retracted position of upper steering shaft of the steering column assembly.
Figure 3:
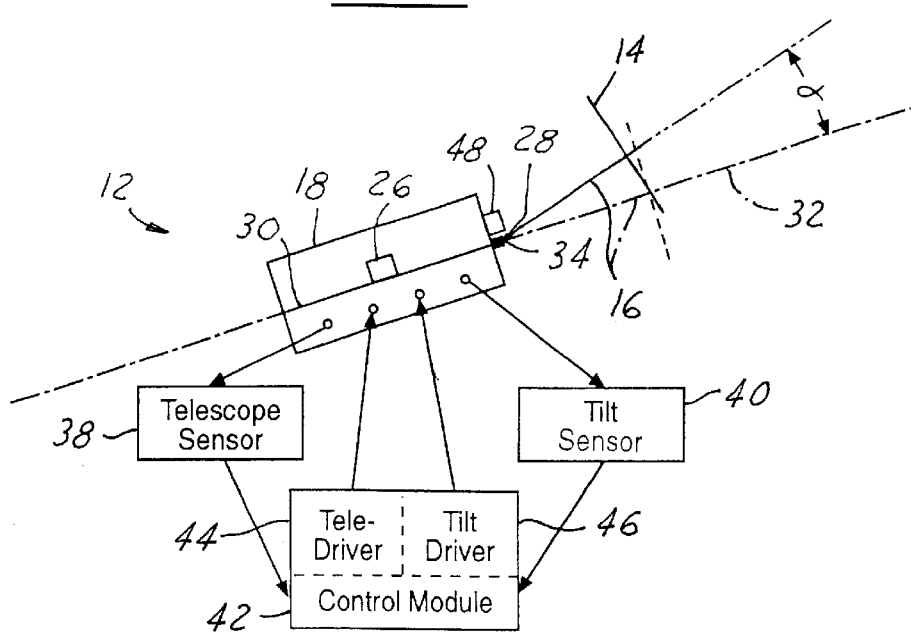
FIG. 3 is a schematic view of the steering column assembly from FIG. 1 showing untilted and tilted positions of the upper steering shaft of the steering column assembly.

As shown generally in FIG. 1, a vehicle 10 having a steering column assembly 12 embodying a currently preferred construction of the invention is provided allowing a driver to have a maximum range of adjustment of a hand wheel 14 of the steering column assembly 12 while driving the vehicle 10, while also having an ability to adjust the hand wheel 14 to a position for easy entry and exit from the vehicle 10. As best shown in FIGS. 2 and 3, and upper steering shaft 16 of the steering column assembly 12 has extended and retracted positions, and untilted and tilted positions. A wide variety of combination of these positions are offered by the invention to provide the driver with the most desirable position of the hand wheel 14, depending on whether the driver is operating the vehicle 10, or simply getting in or out of the vehicle 10.

In FIG. 2, a steering column 18 is schematically shown having the hand wheel 14 connected to an end 20 of the upper steering shaft 16. The hand wheel 14 and upper steering shaft 16 are shown in both a retracted position with the hand wheel 14 moved toward a front end 22 of the vehicle 10, and in an extended position with the hand wheel 14 moved toward a rearward end 24 of the vehicle 10. A mechanical hard stop 26 is shown in a currently preferred embodiment of the invention to limit the amount of axial travel of the upper steering shaft 16, thus limiting how far the upper steering shaft 16 and hand wheel 14 can extend toward the rearward end 24 of the vehicle 10.

The upper steering shaft 16 has an end 28 constructed for pivotal connection to other mating steering components such as a lower steering shaft 30, when present. The upper steering shaft 16 has a longitudinal axis 32 corresponding to the untilted and tilted position such that the axis while in the tilted position, forms a tilt angle a relative to the axis 32 when in the untilted position.

Figure 4:
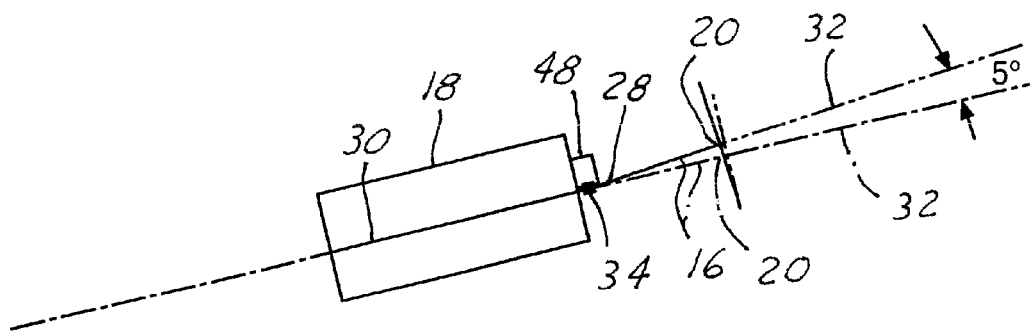
FIG. 4 is a schematic view of the steering column assembly from FIG. 1 showing the upper steering shaft in a filly retracted and fully tilted position.
Figure 5:
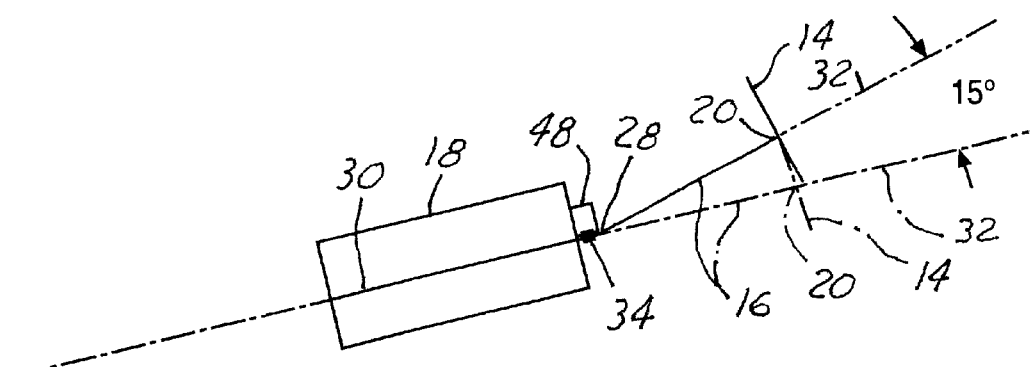
FIG. 5 is a schematic view of the steering column assembly from FIG. 1 showing the upper steering shaft in a fully extended and fully tilted position.

The tilt angle has a vertex 34 generally at the end 28 of the upper steering shaft 16 where the upper steering shaft 16 is pivotally connected to the lower steering shaft 30. The longitudinal axis 32 of the upper steering shaft 16 spans an arc between the untilted position and the tilted position. As shown in FIG. 5, the preferred embodiment shows the axis 32 of the upper steering shaft 16 while in the extended position forming a first maximum tilt angle, and while in a retracted position, as shown in FIG. 4, forming a second maximum tilt angle. The second maximum tilt angle is shown to be less than the first maximum tilt angle, thus preventing the hand wheel 14 from interfering with an instrument panel 36 on the vehicle 10 when in the retracted position.

A telescopic sensor 38 is provided in the steering column assembly 12. The telescopic sensor 38 receives an input signal from the upper steering shaft 16 that provides the telescopic sensor 38 with the axial position of the upper steering shaft 16 relative to a preprogrammed initialized position. The telescopic sensor 38 then communicates the axial position of the upper steering shaft 16 to a central control mechanism, shown here as a control module 42. A tilt sensor 40 is also provided and senses the tilt position of the shaft 16 and communicates with the control module 42.

The control module 42 is preprogrammed with an algorithm that meets the manufacturer's requirements for telescopic travel of the upper steering shaft 16 for the vehicle being manufactured. The algorithm can take on virtually any mathematical formula, thus allowing the steering column 18 to be programmed to meet a wide variety of vehicle platforms. Thus, an algorithm can be provided to allow full telescoping travel of the upper steering shaft 16 between a fully retracted and fully extended position, as shown in FIG. 2. If full telescoping travel takes place, then the hard stop 26 is responsible for limiting the amount of axial travel of the upper steering shaft 16 and hand wheel 14. On the other hand, an algorithm could be provided to limit the telescoping travel of the upper steering shaft 16 from anywhere between full telescoping travel and no telescoping travel. An algorithm limiting the amount of axial travel of the upper steering shaft 16 can be programmed into the control module 42 thus preventing the upper steering shaft 16 from extending toward the rearward end 24 of the vehicle 10 prior to engagement of the hard stop 26. If an algorithm limiting full travel of the upper steering shaft 16 is programmed into the control module 42, the telescoping travel of the upper steering shaft 16 is then limited by a "soft" stop rather than the hard stop 26.

Upon determination of the axial position of the upper steering shaft 16 by the control module 42, the control module 42 communicates with a telescopic controller 44 preferably by way of an electrical connection between the control module 42 and the telescopic controller 44. The telescopic controller 44 then communicates to the upper steering shaft 16 of the steering column assembly 12 to either allow unrestricted telescoping travel of the upper steering shaft 16 up to the hard stop 26, or to limit the telescoping travel of the upper steering shaft 16 to the "soft" stop.

The control module 42 not only communicates with the telescopic controller 44, but also with a tilt controller 46 preferably by way of an electrical connection between the control module 42 and the tilt controller 46. An algorithm preprogrammed into the control module 42 not only facilitates the telescopic travel of the upper steering shaft 16, but also the tilting movement of the upper steering shaft 16. Depending on the mathematical formula of the algorithm, the control module 42 uses the linear position of the upper steering shaft 16 to determine the degree of tilting movement of the upper steering shaft 16, and thus the hand wheel 14. Upon processing the algorithm within the control module 42, the control module 42 communicates information to the tilt controller 46, which communicates with the upper steering shaft 16. The tilt controller 46 facilitates movement of the upper steering shaft 16 between the untilted and tilted positions, depending on the algorithm preprogrammed into the control module 42. An algorithm can be programmed in the control module 42 to allow full tilting movement between the untilted and tilted positions, or can be programmed to restrict the amount of tilting movement to a range anywhere therebetween, including no tilting movement at all. Preferably, the algorithm provides for a varying degree of tilting movement along the telescoping travel of the upper steering shaft 16.

The full degree of tilting movement of the upper steering shaft 16 is limited by a tilting hard stop 48. If however, an algorithm is programmed to limit the degree of tilting movement, then the tilting movement is limited by a "soft" stop. In one presently preferred embodiment of the invention, an algorithm having a mathematical formula of: tiltup limit=f (telescopic position)=((X mm+(22.5 mm)) ÷4.5)+5, where X=telescopic position. Thus, this algorithm provides for telescopic and tilting movement as charted below.

| X = TELE (mm) | TILT (deg°) |
|---|---|
| −20.0 | 5.5 |
| −15.0 | 6.6 |
| −10.0 | 7.7 |
| −5.0 | 8.8 |
| 0.0 | 10.0 |
| 5.0 | 11.1 |
| 10.0 | 12.2 |
| 15.0 | 13.3 |
| 20.0 | 14.4 |
| 25.0 | 15.5 |

The algorithm above is only one presently preferred algorithm for a specific vehicle platform, and should not be viewed as the sole embodiment. As mentioned, virtually any mathematical formula can be used to create an algorithm as best suited for the vehicle platform The algorithm above provides for a tilt angle that is a function of the telescopic position of the upper steering shaft 16, where the function is a linear function. It should be understood that the functional relationship between the telescopic position and the tilt angle could just as easily take on a function that is nonlinear. The table above shows that when the upper steering shaft 16 of the steering column assembly 12 is in a fully retracted telescopic position, at X=−20.0 mm, the degree of tilt α of the upper steering shaft 16 between the untilted and tilted positions is 5.5°. As the telescopic position of the upper steering shaft 16 extends towards a fully extended position, the degree of the tilt angle a increases.

As best shown in FIGS. 4 and 5, the fully retracted and fully extended positions, respectively, provide for a different degree of tilt of the upper steering shaft 16. FIG. 4, showing the upper steering shaft 16 in a fully retracted position, provides for a tilt angle α between the untilted and tilted positions of 5.5°. In this position, it is a "soft" stop provided by the algorithm that limits the degree of tilt of the upper steering shaft 16, and not the hard stop 48. On the other hand, FIG. 5 shows the upper steering shaft 16 in a fully extended position providing for a tilt angle α of 15° between the untilted and tilted positions, and shows the hard stop 48 as limiting the amount of tilt of the upper steering shaft 16.

The steering column assembly 12 having a maximum tilt angle that can change relative to the telescoping or axial position of the upper steering shaft 16 provides greater flexibility in the ability to design the instrument panel 36. The tilting movement of the hand wheel 14 can be better controlled to prevent interference of the steering column 18 and hand wheel 14 with the instrument panel 36.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A steering column assembly, comprising:
   a steering column moveable along an axis having extended and retracted positions relative to said axis and a hand wheel supported on said steering column and tiltable about a pivot axis between tilted and untilted positions; and
   a control mechanism limiting the degree of tilt of said hand wheel while in said tilted position between a first maximum tilt angle and a second maximum tilt angle, said second maximum tilt angle being less than said first maximum tilt angle wherein while said steering column is in said extended position, said steering shaft is moveable to said first maximum tilt angle, and while in said retracted position said steering shaft is moveable to said second maximum tilt angle.

2. The steering column as in claim 1 wherein said steering column has an axial position between and including said extended and retracted positions and said tilt angle is a function of said axial position.

3. The steering column as in claim 2 wherein said function is a linear function.

4. The steering column as in claim 2 wherein said function is a nonlinear function.

5. The steering column as in claim 1 further comprising a telescopic sensor to detect an axial position of said steering shaft between and including said extended and retracted positions; and
   a tilt controller communicating with said telescopic sensor to limit said tilted position of said steering shaft between and including said first maximum tilt angle and said second maximum tilt angle.

6. The steering column as in claim 5 wherein said control mechanism is between and in series with said telescopic sensor and said tilt controller to receive an input signal from said telescopic sensor and to send an output signal to said tilt controller to limit said tilted position of said steering shaft between and including said first maximum tilt angle and said second maximum tilt angle.

* * * * *